Patented Aug. 26, 1930

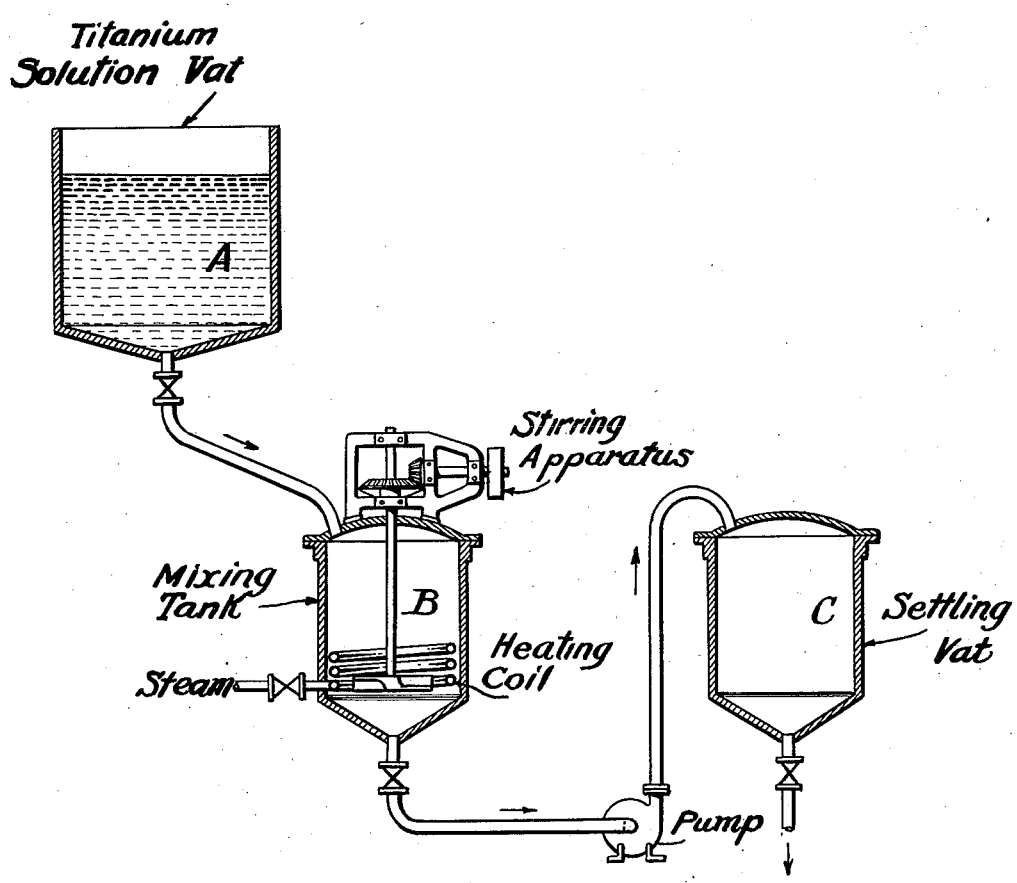

1,773,727

UNITED STATES PATENT OFFICE

PEDER FARUP, OF VETTAKOLLEN, VESTRE AKER, NORWAY, ASSIGNOR TO TITANIUM PIGMENT COMPANY INC., OF NEW YORK, N. Y., A CORPORATION OF MAINE

PROCESS FOR PRECIPITATING TITANIUM COMPOUNDS

Application filed April 19, 1927, Serial No. 185,078, and in Norway May 12, 1926.

My invention relates to titanium compounds and the object of the invention is a process whereby such compounds are precipitated from titaniferous solutions.

Titanium compounds are generally separated from iron and other compounds by heating a solution containing said compounds whereby a hydrolytic decomposition is effected and insoluble titanium compounds are precipitated. When proceeding in the usual manner a colloidal precipitate is first formed which gradually grows denser and finally is transformed to a regular precipitate.

I have now found that the composition, purity and physical properties of such precipitated titanium compounds to a great extent depend on the conditions under which the hydrolytic decomposition takes place, such as composition of the solution employed, temperature, duration of boiling, etc.

When employing the known precipitation processes, the said precipitation conditions are not constant as great changes in the composition of the solution will take place when the precipitate is formed and a corresponding amount of acid is liberated. When working on a technical scale with concentrated solutions, the change is especially remarkable. Such solutions may, for example, be produced from ilmenite by treatment with sulphuric acid and may then contain from 50 to more than 300 grams $TiO_2$ per liter combined with sulphuric acid.

It will be understood that the character of such a solution will vary considerably during the precipitation and the formation of the precipitate will take place under entirely different conditions at the beginning and at the end of the process. The precipitate will consequently not be of uniform quality.

According to my present invention I effect the precipitation in a solution having a constant or approximately constant composition and therefore obtain a precipitate of great uniformity and with the physical qualities desired.

In order to carry out my invention I proceed as follows:

A solution rich in titanium is led from a storage vat to a precipitation vat already containing precipitated solution or solution under precipitation. The fresh solution is added and thoroughly mixed in such a quantity that under the prevailing conditions a precipitation takes place corresponding approximately to the amount of solution added. The solution may be added continuously or discontinuously.

I prefer to keep the solution in motion during precipitation to obtain a homogeneous mixture of fresh solution and solution which has already been deprived of part of its titanium content. Such motion may be effected by means of stirring apparatus or rotating vats and also by means of injectors for introducing steam, solution or a mixture of both. In this way the fresh solution is thoroughly mixed with the solution under treatment before precipitation has taken place in the fresh solution.

After a complete or only partial hydrolysis the solution may be subjected to further treatments as, for example, heating under different pressures, which may take place in the same or another container.

When the hydrolysis has been carried to the desired point, I remove the solution with therein suspended precipitate which is separated off in any known way as by filtration and then washed. The acid filtrate may be wholly or partly used for other purposes as recovery of acid and iron compounds, for dissolution of titanium compounds or used in other chemical processes. A part of the filtrate may be returned to the precipitation vessel. It will be understood that the amount of solution added to the precipitation vessel must approximately equal the amount of solution removed therefrom to keep the system in balance. It is however, not necessary although preferable, that addition and removal of solution be carried out continuously.

To illustrate how my invention may be successfully carried out specific examples are given in detail:

*Example 1.*—In the drawing forming part hereof, the storage vat A by a pipe leads to the tank B provided with a stirring apparatus and a coil for steam heating. A pipe leads from the tank B through a pump to the settling vat C.

The vat A is filled with a solution containing titanium and iron sulphates of the approximate composition:

| | Per cent |
|---|---|
| Titanic oxide ($TiO_2$) | 9.1 |
| Ferrous oxide (FeO) | 10.9 |
| Total sulphate calculated as $SO_3$ | 30.2 |
| Reduced $TiO_2$ (grams per liter) | 1.5 |

The tank B is filled with a solution of titanium iron sulphate, already heated to precipitation temperature and partly decomposed; its composition is approximately as follows:

| | Per cent |
|---|---|
| Precipitated $TiO_2$ | 8.2 |
| $TiO_2$ in solution | 0.9 |
| FeO in solution | 10.9 |
| Free sulphuric acid | 20.5 |

The solution in B is kept in lively motion by means of the stirring apparatus. The valve in the pipe-line between A and B is now opened and a solution will run from A to B where it is immediately mixed with the solution already present. The valve at the bottom of B is now also opened and a stream of the resultant mixture will continuously flow into the vat C where the precipitate formed in B may settle. The rate of flow is regulated to secure the desired precipitation in the solution. The precipitate settled in C is removed, washed and heated in any well known way.

It will be understood that in above example precipitation will take place in solution of practically constant composition.

*Example 2.*—A solution of the composition given in Example 1 is first treated as therein described but upon removal from the precipitation vessel it is led into another vessel and there subjected to further heating until more precipitate is formed. The solution is then removed, settled, and the precipitate washed and further treated in any well-known way.

*Example 3.*—A solution having the composition first stated in Example 1 is led into a precipitation vessel and heated until practically complete precipitation has taken place. 4/5 of the solution is now removed. The remaining 1/5 is kept at precipitation temperature and fresh solution is slowly added at a rate to secure a practically constant content of dissolved titanium. When the vessel is full the supply of solution is interrupted and 4/5 of the solution is again removed. These operations may be repeated as often as desired.

I may vary the conditions within wide limits, depending on the concentration and composition of the solution speed of the desired decomposition and qualities wanted in the precipitated products. The temperature employed may vary from considerably below the boiling point of the solution at atmospheric pressure to the boiling point at very high pressure. I may also suspend solids in the solution upon which solids the titanium compounds are precipitated forming a composite precipitate.

The required heat may be supplied to the precipitation vessel in any known manner, for instance electrically, by saturated or superheated steam or in other ways.

According to my present process the principal part of my precipitate will be formed in an acid solution comparatively poor in titanium and with practically constant qualities. The precipitate is characterized by great uniformity and forms an excellent raw-material for the production of other titanium products, such as titanium dioxide, pigments and paints.

I claim as my invention:

1. The process of precipitating titanium compounds by hydrolysis which comprises heating a titanium solution to cause precipitation of titanium compounds therein, and adding during said precipitation another titanium solution in amount sufficient to maintain a substantially constant composition and to make up for the titanium compounds so precipitated.

2. The process of precipitating titanium compounds by hydrolysis, which comprises heating a titanium sulphate solution to cause precipitation of titanium compounds therein, and adding during said precipitation another titanium sulphate solution in amount sufficient to maintain a substantially constant composition and to make up for the titanium compounds so precipitated.

3. The process of precipitating titanium compounds by hydrolysis, which comprises heating a titanium solution to cause precipitation of titanium compounds therein, and adding during said precipitation another titanium solution in amount sufficient to continually maintain an approximately constant composition in the solution from which the titanium compounds are being precipitated.

4. The process of precipitating titanium compounds by hydrolysis, which comprises heating a titanium solution to cause precipitation of titanium compounds therein, and continuously adding during said precipitation another titanium solution in amount sufficient to maintain a substantially constant composition and to make up for the titanium compounds being precipitated therein.

5. The process of precipitating titanium compounds by hydrolysis, which comprises heating under pressure a titanium solution to cause precipitation of titanium compounds therein, and adding during said precipitation another titanium solution in amount sufficient to maintain a substantially constant composition and to make up for the titanium compounds so precipitated.

6. The process of precipitating titanium compounds by hydrolysis, which comprises heating a titanium solution in the presence of solids suspended therein to cause precipitation of titanium compounds therein, and adding during said precipitation another titanium solution in amount sufficient to maintain a substantially constant composition and to make up for the titanium compounds so precipitated.

7. The process of precipitating titanum compounds by hydrolysis, which comprises heating a solution containing a titanium salt to cause precipitation of titanium compounds therein with liberation of corresponding free acid, and adding during said precipitation another solution containing said titanium salt in amount sufficient to continually maintain a practically constant composition in the solution from which the titanium compounds are being precipitated.

8. The process of precipitating titanium compounds by hydrolysis, which comprises heating a titanium solution to cause precipitation of titanium compounds therein, adding during said precipitation another titanium solution in amount sufficient to maintain a substantially constant composition and to make up for the titanium compounds so precipitated, removing said precipitated titanium compounds and solution at a rate approximate to the volume of added solution, and heating same to further precipitation of titanium compounds therein.

9. The process of precipitating titanium compounds by hydrolysis, which comprises heating a titanium solution to cause precipitation of titanium compounds therein, adding during said precipitation another titanium solution in amount sufficient to maintain a substantially constant composition and to make up for the titanium compounds so precipitated while simultaneously removing said precipitated titanium compounds and solution at a rate approximate to the volume of added solution.

PEDER FARUP.